United States Patent
Tsook

[11] Patent Number: 5,251,333
[45] Date of Patent: Oct. 12, 1993

[54] HELMET MOUNTED DISPLAY DEVICE

[76] Inventor: Nir Tsook, 36 Hate'ena Street, Carmei Yosef, Israel

[21] Appl. No.: 953,513

[22] Filed: Sep. 29, 1992

[30] Foreign Application Priority Data

Oct. 9, 1991 [IL] Israel ............................ 99697

[51] Int. Cl.$^5$ .................................................. A42B 3/00
[52] U.S. Cl. .......................................... 2/6.2; 359/630; 2/6.5
[58] Field of Search ................. 2/6; 359/630, 631, 634

[56] References Cited

U.S. PATENT DOCUMENTS

| | | | |
|---|---|---|---|
| 3,787,109 | 1/1974 | Vizenor | 2/6 |
| 3,816,005 | 6/1974 | Kirschner | 2/6 |
| 4,021,935 | 5/1977 | Witt | 2/6 |
| 4,181,405 | 1/1980 | Cohen | 2/6 |
| 4,364,636 | 12/1982 | Ellis | 2/6 |
| 4,398,799 | 8/1983 | Swift | 2/6 |
| 5,089,914 | 2/1992 | Prescott | 2/6 |
| 5,200,856 | 4/1993 | Beaussant | 359/630 |

FOREIGN PATENT DOCUMENTS

| | | | |
|---|---|---|---|
| 225317 | 10/1991 | Japan | 359/630 |
| 92016867 | 10/1992 | World Int. Prop. O. | 359/630 |

Primary Examiner—Clifford D. Crowder
Assistant Examiner—Diana L. Biefeld
Attorney, Agent, or Firm—Weiser & Associates

[57] ABSTRACT

A helmet mounted display device including an opaque display element arranged to be mounted on a helmet visor outside of a wearer's usual instantaneous field of view and a display control circuit disposed remotely from the display element and coupled thereto by signal transmission apparatus.

8 Claims, 2 Drawing Sheets

HELMET MOUNTED DISPLAY DEVICE

FIELD OF THE INVENTION

The present invention relates display systems generally and more particularly to helmet mounted display systems.

BACKGROUND OF THE INVENTION

Various types of helmet mounted display systems are known in the art. In recent years helmet mounted head-up displays have been developed and allow images to be displayed in overlay over the wearer's view of the outside world. Generally speaking head-up displays are relatively expensive and heavy and must be specially designed for each given helmet.

SUMMARY OF THE INVENTION

The present invention seeks to provide a simplified helmet mounted display system.

There is thus provided in accordance with a preferred embodiment of the present invention a helmet mounted display device including an opaque display element arranged to be mounted on a helmet visor outside of a wearer's usual instantaneous field of view and a display control circuit disposed remotely from the display element and coupled thereto by signal transmission apparatus.

In accordance with a preferred embodiment of the present invention, the opaque display element includes an optical element which makes the display appear to the wearer as if it lies at infinity, so as to obviate the need for the wearer to refocus his eyes in order to read the display.

Additionally in accordance with a preferred embodiment of the present invention, the display element is mounted on the outside of a transparent visor.

In accordance with a preferred embodiment of the invention, the display element is removably mounted on the visor.

Further in accordance with a preferred embodiment of the invention, the transparent visor is retractable and the helmet is formed with a recess for accomodating the display element when the visor is retracted.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
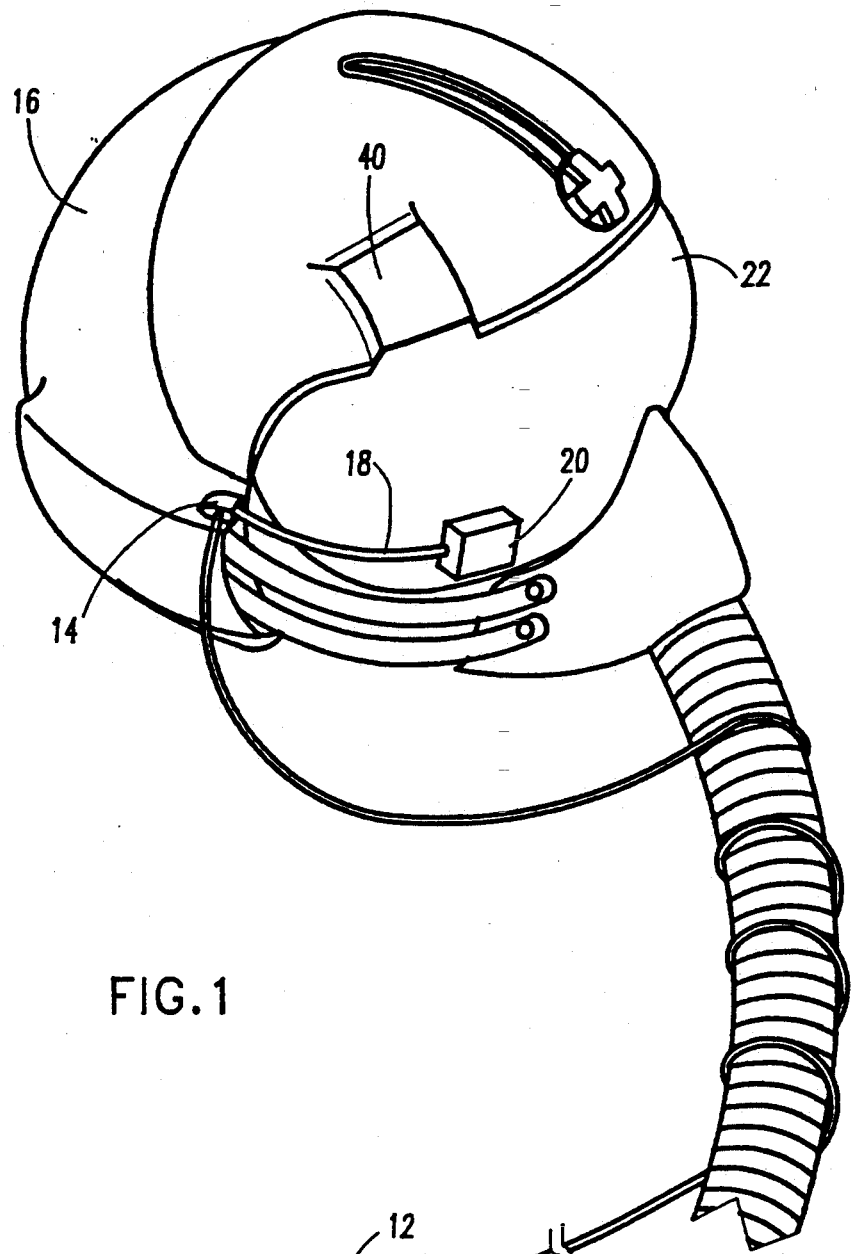
FIG. 1 is a pictorial illustration of a helmet display system constructed and operative in accordance with a preferred embodiment of the present invention.
Figure 2A:
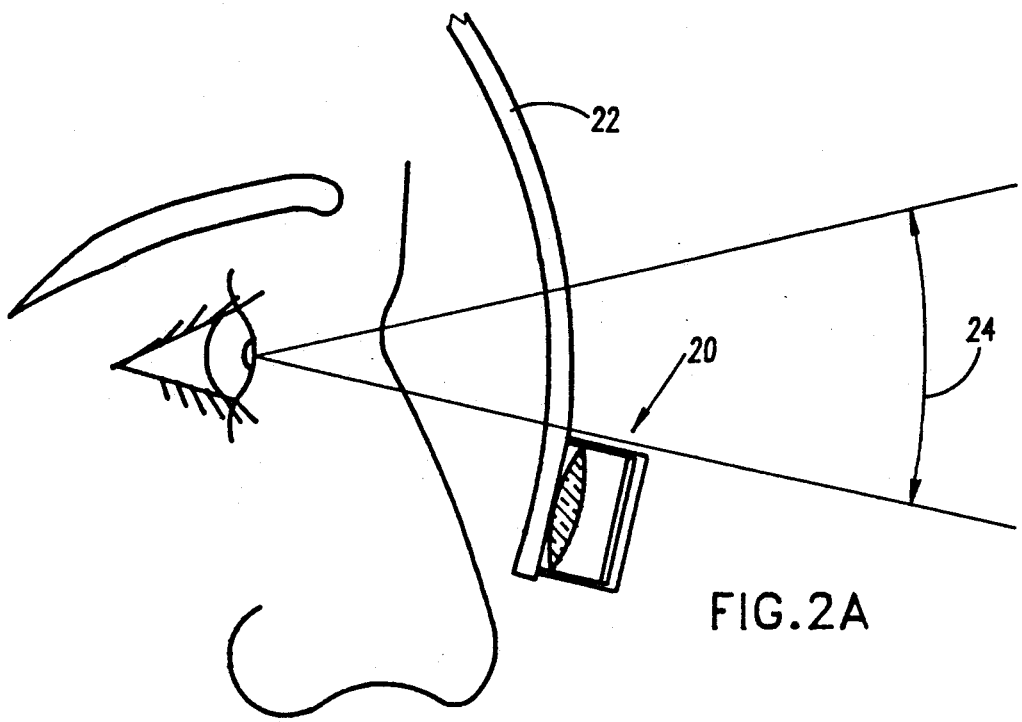
FIGS. 2A and 2B are illustrations of the orientation of a display element forming part of the display system of FIG. 1 for two different wearer eye orientations.
Figure 2B:
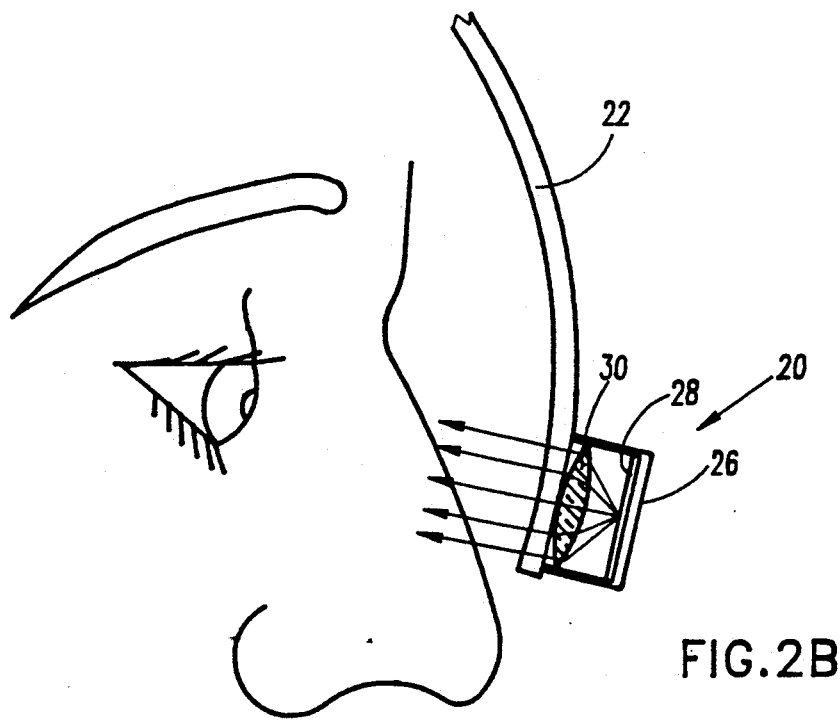

Reference is now made to FIGS. 1–2B which illustrate a helmet display system constructed and operative in accordance with a preferred embodiment of the present invention.

The helmet display system comprises control circuitry 10, which may be similar in all relevant respects to conventional, commercially available control circuitry for helmet mounted head-up displays. Control circuitry 10 receives input information from a system to be monitored, such as an aircraft or any other airborne system and provides a display output via signal transmission apparatus, which is preferably a flexible conductor 12.

In the illustrated preferred embodiment, the conductor 12 terminates at a coupling member 14, which is mounted on a helmet 16. Coupling member is flexibly connected, via a conductor 18, to a display element 20, which, as seen in FIGS. 2A and 2B is preferably mounted at a location on a transparent helmet visor 22, which is outside the normal instantaneous field of view 24 of the wearer.

As seen in FIG. 2B, the display element 20 preferably comprises a housing 26 in which is disposed a display 28, such as a LCD display, for example a 240×648 element, 0.96 diagonal active matrix color LCD, available from Citizen Watch Company of Japan or a 324×220 element 0.9 inch diagonal active matrix black and white LCD available from Matsushita of Japan, or any other suitable display. An optical element, such as a collimating lens 30, is provided to cause the display 28 to appear to the wearer as at infinity.

In accordance with a preferred embodiment of the present invention, the helmet 16 is formed with a recess 40 for accomodating display element 20 when the visor 22 is retracted.

It will be appreciated by persons skilled in the art that the present invention is not limited by what has been particularly shown and described hereinabove. Rather the scope of the present invention is defined only by the claims which follow.

I claim:

1. A helmet including a transparent visor, a display device including an opaque multi-element LCD display element mounted on said helmet visor so as to be directly viewable by a wearer at a location outside of the wearer's usual instantaneous field of view and a display control circuit disposed remotely from the display element and coupled thereto by signal transmission apparatus.

2. A helmet mounted display device according to claim 1 and wherein said opaque display element includes an optical element which makes the display appear to the wearer as if it lies at infinity, so as to obviate the need for the wearer to refocus his eyes in order to read the display.

3. A helmet mounted display device according to claim 2 and wherein said display element is mounted on the outside of said transparent visor.

4. A helmet mounted display device according to claim 3 and wherein said transparent visor is retractable and the helmet is formed with a recess for accomodating the display element when the visor is retracted.

5. A helmet mounted display device according to claim 2 and wherein said display element is mounted on the outside of said visor.

6. A helmet mounted display device according to claim 1 and wherein said display element is mounted on the outside of said transparent visor.

7. A helmet mounted display device according to claim 6 and wherein said transparent visor is retractable and the helmet is formed with a recess for accomodating the display element when the visor is retracted.

8. A helmet mounted display device according to claim 1 and wherein said display element is mounted on the outside of said visor.

* * * * *